J. G. KNOWLES & W. E. MARTIN.
MACHINE FOR MAKING FLY TRAPS.
APPLICATION FILED AUG. 14, 1915.

1,262,357.

Patented Apr. 9, 1918.
3 SHEETS—SHEET 1.

Inventors
Joseph G. Knowles
William E. Martin
By Milo B. Stevens & Co.
Attorney

J. G. KNOWLES & W. E. MARTIN.
MACHINE FOR MAKING FLY-TRAPS.
APPLICATION FILED AUG. 14, 1915.

1,262,357.

Patented Apr. 9, 1918.
3 SHEETS—SHEET 2.

Inventors
Joseph G. Knowles
William E. Martin
By Milo B. Stevens & Co.
Attorneys J. G. KNOWLES & W. E. MARTIN.
MACHINE FOR MAKING FLY TRAPS.
APPLICATION FILED AUG. 14, 1915.

1,262,357.

Patented Apr. 9, 1918.
3 SHEETS—SHEET 3.

Inventors
Joseph G. Knowles
William E. Martin
By Milo B. Stevens & Co.
Attorneys.

BEST AVAILABLE COPY

BEST AVAILABLE COPY

UNITED STATES PATENT OFFICE.

JOSEPH G. KNOWLES AND WILLIAM E. MARTIN, OF WATERVLIET, NEW YORK, ASSIGNORS TO ALBERT G. DICKINSON, OF GRAND RAPIDS, MICHIGAN.

MACHINE FOR MAKING FLY-TRAPS.

1,262,357. Specification of Letters Patent. Patented Apr. 9, 1918.

Application filed August 14, 1915. Serial No. 45,525.

*To all whom it may concern:*

Be it known that we, JOSEPH G. KNOWLES and WILLIAM E. MARTIN, citizens of the United States, residing at Watervliet, in the county of Albany and State of New York, have invented certain new and useful Improvements in Machines for Making Fly-Traps, of which the following is a specification.

The machine which is the subject matter of the present application for patent is designed for making fly-traps of that type consisting of a strip of paper coated with some sticky substance and wound up into a roll. The roll is inclosed in a box or container open at one end, and the outer end of the coated strip is fastened in the box. Upon grasping the inner end of the coiled strip and pulling the same outward, the strip is drawn out similar to a telescope, and it may then be hung up, a suitable suspension loop being attached to the inner end of the roll.

The invention has for its object to provide a novel and improved means for coating and coiling the strip, and also applying an adhesive for securing the strip in the box, together with a means for ejecting the rolled strip from the roll-forming device and inserting it into the box.

The object stated is attained by means of a combination and arrangement of parts to be hereinafter described and claimed, and in order that the same may be better understood, reference is had to the accompanying drawings, in which—

Figures 1, 4:
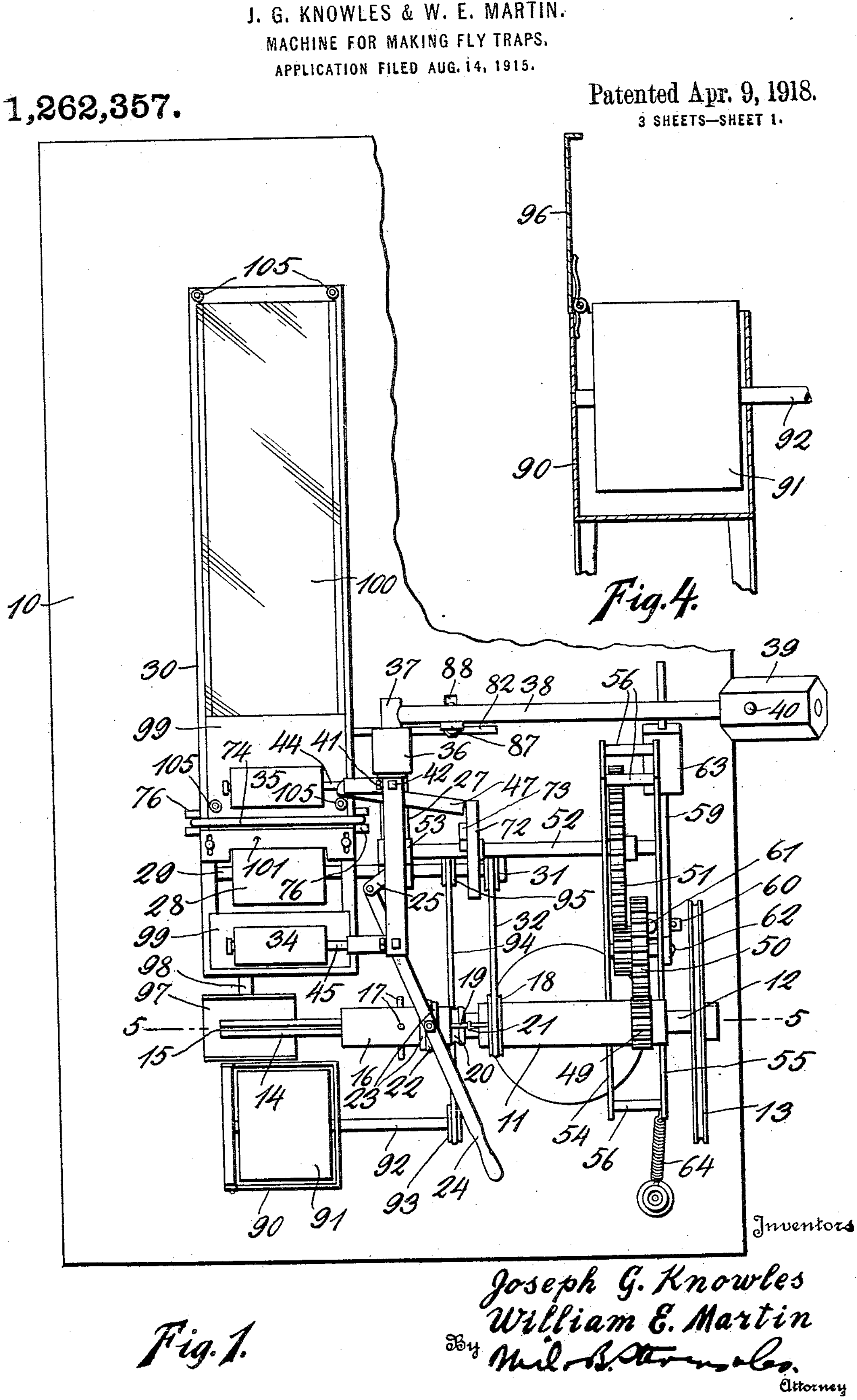
Figure 2:
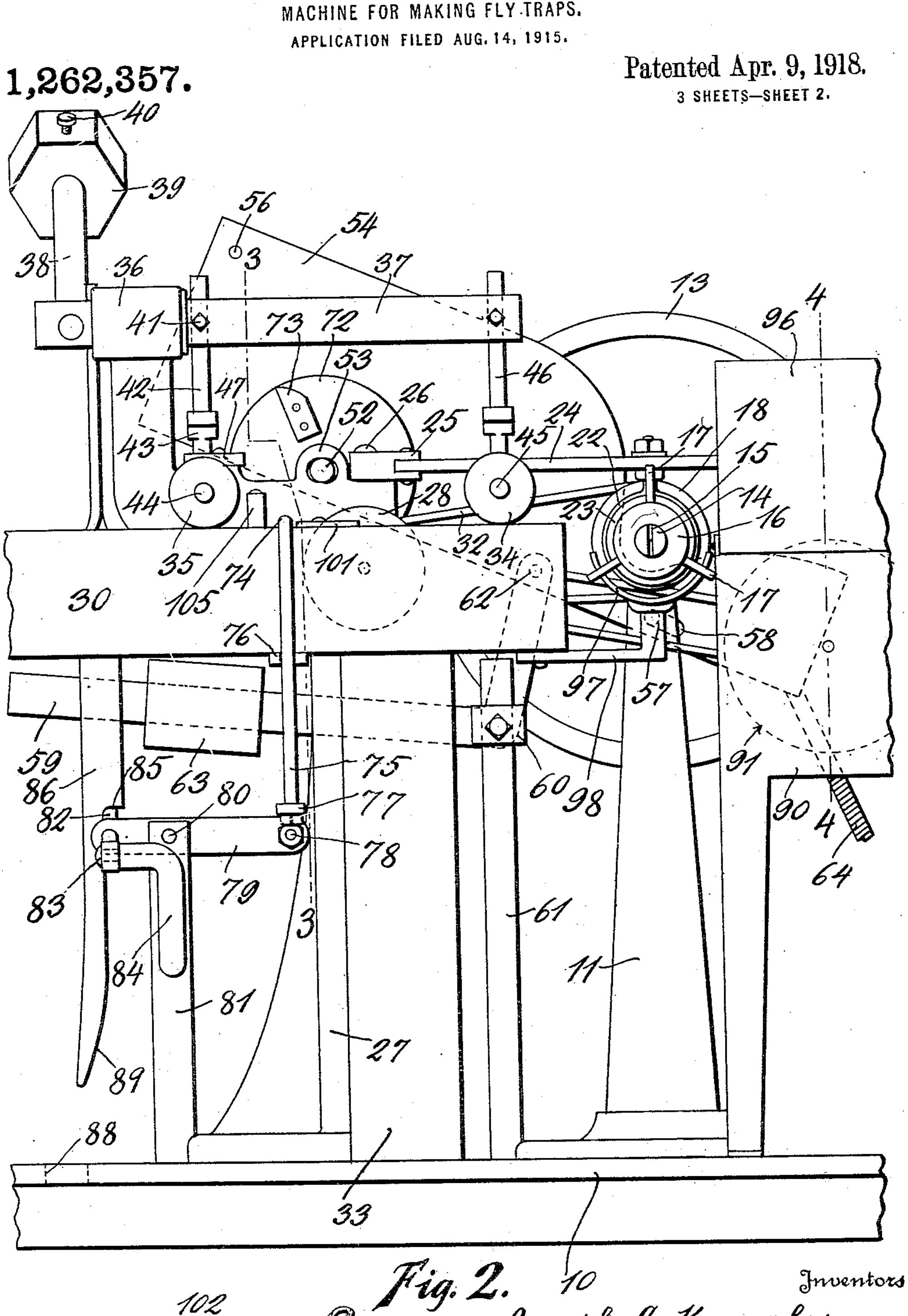
Figure 9:
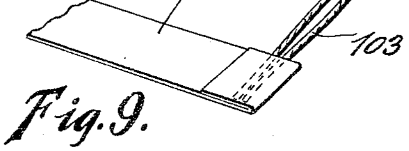
Figures 3, 5, 6, 7, 8:
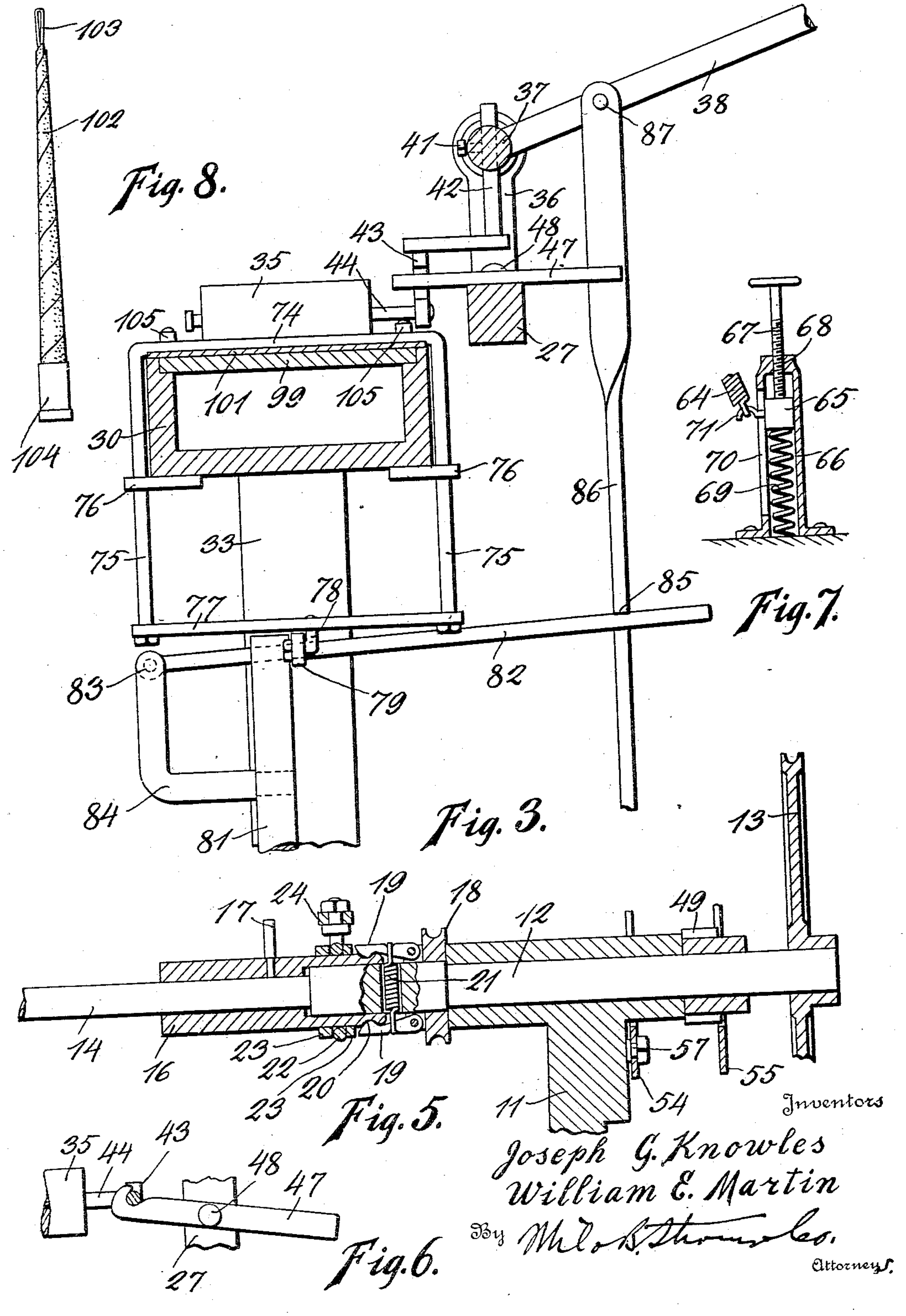

Figure 1 is a plan view of the machine; Fig. 2 is a front elevation thereof, partly broken away; Fig. 3 is a cross-section on the line 3—3 of Fig. 2; Fig. 4 is a cross-section on the line 4—4 of Fig. 2; Fig. 5 is a longitudinal section on the line 5—5 of Fig. 1; Fig. 6 is a plan view of the latch device; Fig. 7 is a sectional detail of a spring adjuster; Fig. 8 is an elevation showing the finished article, and Fig. 9 is a perspective detail showing one end of the paper strip to be coated and wound into a roll.

Referring specifically to the drawings, 10 denotes a suitable base which supports the entire machine. On the base is mounted a bearing standard 11 which supports the main drive shaft 12, said shaft being provided with a pulley 13 which transmits power to the shaft from any suitable source. One end of the shaft has a reduced portion 14 forming a spindle on which the paper strip is wound, the spindle having a longitudinal slot 15 to hold the end of the strip.

On the spindle 14 is slidably mounted, in the direction of the length thereof, an ejector 16 for stripping the finished roll off the spindle and inserting the same into the box designed to receive and hold the roll. The ejector is a sleeve and carries pins or fingers 17 for a purpose to be presently described, and a means is provided for coupling the ejector to the shaft 12 to turn therewith, as follows: On the shaft 12 is fast a pulley 18 carrying two diametrically opposite, hook-shaped dogs 19 engaging an annular groove 20 in the ejector adjacent to the rear end of the latter. The dogs are connected by a coiled spring 21 which tends to draw them together to grip the ejector with sufficient force so that it turns with the pulley 18. However, the dogs do not permanently couple the ejector to the pulley, but yield and slip out of the groove 20 when the ejector is slid forward on the spindle 14 to strip off the finished roll.

The ejector 16 is operated by a yoke 22 loosely straddling the same between collars 23. The yoke is operatively connected to a hand lever 24 pivoted at one end to a link 25, which latter is pivoted at 26 to a bearing stand 27 rising from the base 10. The link connection 25 is provided to give the lever sufficient play to move the ejector the required distance along the spindle 14.

To one side of the spindle 14 is located a roller 28 for coating the paper strip with the sticky solution. This roller has its shaft 29 supported in bearings mounted on the side walls of a tank or other suitable receptacle 30 containing the solution. One end of the shaft extends from the tank and has a pulley 31 which is connected by a belt 32 to the pulley 18, and thus the coating roller is driven by the shaft 12. The tank

BEST AVAILABLE COPY 30 is supported by standards 33 rising from the base 10.

On opposite sides of the coating roller 28 are mounted tension rollers, the front tension roller being indicated at 34 and the rear tension roller at 35. These rollers bear down on the paper strip and press it against the coating roller, the strip passing over the top of the coating roller and beneath the tension rollers. At the proper time, the tension rollers are elevated to release the strip, the following means being provided for this purpose:

From the stand 27 rises a bearing 36 in which is journaled a rock-shaft 37 to which is connected an arm 38 extending laterally from the shaft and carrying a weight 39, the latter being adjustable on the arm and held in adjusted position by a set screw 40. Passing transversely through the rock-shaft, and held adjustably in an opening therein by a set screw 41, is a stem 42 having an offset 43 which carries the shaft 44 of the roller 35. In a like manner the shaft 45 of the roller 34 is carried by a stem 46. The stems 42 and 46 extend vertically downward from the rock-shaft when the tension rollers are in operative position and the axes of the rollers are at a right angle to the axis of the rock-shaft. Thus, when the weighted end of the arm 38 swings down, the shaft 37 is rocked in a direction to swing the tension rollers upward, clear of the paper strip. A latch lever 47, pivoted at 48 to the stand 27, engages the offset 43 of the stem 42 when the tension rollers are in operative position, and locks the same. Upon swinging the latch to disengage the part 43, the rock shaft is released and free to rock to elevate the tension rollers.

The following means are provided for releasing the latch 47 and timing the operation of such release:

On the shaft 12 is fast a pinion 49 which is geared by a reducing gear 50 to a spur gear 51 on a shaft 52 supported at one end in a bearing 53 on the stand 27, and at the other end in a rocking frame composed of plates 54 and 55 connected in spaced relation by spacing bolts 56. These plates also support the reducing gear 50. The plate 55 is pivoted to the side of the standard 11 by a pin 57 on the latter, the plate having a slot 58 into which the pin extends. This connection of the plate 55 with the standard 11 provides a movable support for the gear 50 and the shaft 52 carrying the gear 53, and upon swinging the plate rearward, the gear 50 is disconnected from the pinion 49, thus breaking the driving connection between the shafts 12 and 52. This operation is effected by an angle lever 59 fulcrumed at 60 to a post 61 rising from the base 10. The angle lever has a short arm which is connected to the plate 55 at 62, and on the long arm of the lever is mounted a weight 63. The long arm of the lever is in the path of the arm 38, and when the latter swings down it strikes the lever, and as the latter swings about its fulcrum, the plate 55 is carried rearward to disconnect the gear 50 from the pinion 49. This movement of the plate 55 is opposed by a spring 64 connected at one end to said plate and anchored at the other end to a plunger 65 slidably mounted in a cylinder 66 fixed to the base 10. The plunger is engaged by a screw stem 67 threaded through a nut 68 at the top of the cylinder and beneath the plunger the cylinder incloses a spring 69. One side of the cylinder has a slot 70 through which extends a hook 71 to which the spring 64 is connected. The tension of the spring 64 is adjusted by sliding the plunger up or down in the cylinder, a downward movement of the plunger stretching the spring and increasing its tension, and an upward movement relieving the spring. The spring 69 pushes the plunger upward to follow the screw stem when the latter is unscrewed. The tension of the spring 64 is greater than the tendency of the lever 59 to swing by reason of the weight 63, and the gear 50 is therefore normally held in mesh with the pinion 49.

The shaft 52 is sufficiently loose in the bearing 53 to permit the slight sidewise tilt when the plate 55 swings to take the gear 50 into or out of mesh with the pinion 49.

On the shaft 52 is fast a trip device composed of a disk 72 having mounted on one of its faces an abutment 73. The latch 47 extends into the path of this abutment, and when struck thereby, the latch is swung in a direction to disengage the part 43 and thus release the rock-shaft 37, whereupon the arm 38 swings down to elevate the tension rollers 34 and 35, and also to disconnect the gear 50 from the pinion 49.

Between the rear tension roller 35 and the solution roller 28 is located a throw-off device for the paper strip, it being necessary to have a short portion of the last end of the strip free from the solution. The throw-off device is a cross bar 74 so positioned that when it is down in inoperative position it lies beneath the strip of paper between the rollers 35 and 28. At the proper time, the cross bar is elevated, and it lifts the paper strip and frees it from the roller 28. At the ends of the cross bar are depending arms 75 straddling the sides of the tank 30, the latter having guides 76 in which the arms work. Beneath the tank, the arms are connected by a cross bar 77 which is connected by an angular pivot bolt 78 to one end of a lever 79 fulcrumed at 80 to a post 81 rising from the base 10. The other end of the lever 79 is connected to an arm 82 pivoted at one end, as indicated at 83, to a support 84 carried

BEST AVAILABLE COPY by the post 81. The free end of the arm 82 engages a shoulder 85 on a push bar 86 pivoted at 87 to the arm 38 and depending therefrom. Thus, when the arm 38 swings down as hereinbefore described, the cross bar 74 is elevated to lift the paper strip off the roller 28, this action being effected through the arm 82, lever 79, cross bar 77 and arms 75. At the end of the downward movement of the arm 38, the lower end of the push bar 86 enters a hole 88 in the base and is carried sidewise to disengage the shoulder 85 from the arm 82, whereupon the cross bar 74 drops back to inoperative position. The lower end of the push bar has a beveled edge 89 whereby the lateral movement is obtained when the same enters the hole 88. The pivotal connection 87 is sufficiently loose to permit this movement of the push bar.

In front of the spindle 14 is mounted a tank 90 containing an adhesive and a roller 91 for applying the same to the last end of the paper strip to secure the rolled strip in the box designed to hold the same. The roller is rotatable, it being mounted on a shaft 92 having a pulley 93 connected by a belt 94 to a pulley 95 on the shaft 29. The tank 90 has a hinged lid 96.

Beneath the spindle 14 is mounted a stationary roll holder 97 carried by a bracket 98 mounted on the front end of the tank 30. This holder is a plate of substantially semicircular shape, concentric with the spindle and encircling the lower half thereof, and its function is to prevent the strip rolled on the spindle from unrolling, thereby holding the roll tightly wound so that it can be readily pushed into the box by the ejector 16.

Beneath the tension rollers 34 and 35, the tank 30 has a metal top 99 forming a bed for the paper strip. To the rear of the tension roller 35, the tank has a glass cover 100 to enable the operator to observe the solution supply.

Adjacent to the roller 28 is mounted a scraper plate 101 to remove from said roller any surplus solution.

The operation of the machine may be summarized as follows:

Fig. 9 shows the paper strip 102 to be coated and wound into a roll. The end of the strip which is to be inside the roll is placed in the slot 15 of the spindle 14 by hand, and the suspension loop or cord 103 is hooked over one of the pins 17, after which a fold is made in the end of the strip, and the loop is placed in the fold and secured by an adhesive. The paper strip is also carried back and placed on the metal and glass tops 99 and 100 of the tank 30, under the tension rollers 34 and 35 and over the top of the coating roller 28. The tension rollers are now lowered to press the strip on the coating roller. The machine is now started, whereupon the strip is wound on the spindle 14, the sticky solution being applied to the strip as it passes over the roller 28. When the rear end of the strip approaches the rear tension roller 35, this roller and the tension roller 34, are elevated by the mechanism hereinbefore described, and said end of the strip is pushed up, clear of the roller 28, by the throw-off cross bar 74. As the spindle continues to rotate, the end of the strip flies over the roller 91, and the latter applies an adhesive to the uncoated end of the strip for securing the roll in the box 104. The end of the strip is now rolled up on that portion of the strip already rolled up, and the ejector 16 is then advanced to push the finished roll into the box 104, the latter being held by the operator in line with the spindle. The plate 97 holds the roll in shape and prevents the same from uncoiling as it is pushed off the spindle into the box. The machine is now ready for another operation. The pin 17 prevents the loop 103 from being wound up with the strip, and keeps it free from any of the solution which may squeeze out at the end of the roll.

When the machine is started, that portion of the strip which is between the spindle and the coating roller is not coated by the latter, in order to allow the adhesive, which secures the loop 103, to set. However, the solution eventually permeates the uncoiled portion of the strip and also the end which is pasted in the box. The solution is applied hot, a suitable heater for the tank 30 being provided.

Fig. 8 shows the trap extended ready for use.

The top of the tank 30 carries edge guides 105 for the paper strip.

We claim:—

1. A machine of the character described comprising means for coating a strip, a rotatable spindle on which the coated strip is wound into a roll, a roll ejector movable along the spindle to eject the roll therefrom, and yielding means for coupling the ejector to the spindle to rotate therewith, said means releasing the ejector when the latter is moved to eject the roll.

2. A machine of the character described comprising means for coating a strip, a rotatable spindle on which the coated strip is wound into a roll, a roll ejector movable along the spindle to eject the roll therefrom, and means for coupling the ejector to the spindle to rotate therewith when the strip is being wound, the ejector being uncoupled from the spindle when the ejector is moved along the latter to eject the roll.

3. A machine of the character described comprising means for coating a strip, a rotatable spindle on which the coated strip is wound into a roll, a roll ejector movable

BEST AVAILABLE COPY along the spindle to eject the roll therefrom, and a radial loop-holding pin carried by the ejector.

4. A machine of the character described comprising means for coating a strip, a rotatable spindle on which the coated strip is wound into a roll, a roll ejector movable along the spindle to eject the roll therefrom, the ejector having an annular external groove, and pivoted spring-pressed coupling dogs carried by the spindle and yieldingly engageable with the ejector groove.

5. In a machine of the character described, a rotatable spindle, means for coating a strip, said spindle having means for attaching one end of the strip thereto to wind the coated strip into a roll, means for holding a portion of the other end of the strip free of the coating means, means for applying an adhesive to the last mentioned end of the strip on the reverse of the coated side, said end being also wound on the roll and the adhesive being on the outside of the roll, and means for ejecting the roll from the spindle.

6. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a pivoted support for the tension rollers, means for swinging said support to release the tension rollers from the strip when the end thereof is reached, a latch engageable with the support for holding the tension rollers in operative position, and means for tripping the latch.

7. In a machine of the character described, a rotatable spindle, means for coating a strip, said spindle having means for attaching one end of the strip thereto to wind the coated strip into a roll, means for ejecting the roll from the spindle, tension rollers assocated with the coating means to hold the strip in engagement therewith, a pivoted support for the tension rollers, means for swinging said support to release the tension rollers from the strip when the end thereof is reached, a latch engageable with the support for holding the tension rollers in operative position, a gearing, a driving means for the gearing, a shaft driven by the gearing, and a latch trip device carried by the shaft.

8. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a pivoted support for the tension rollers, means for swinging said support to release the tension rollers from the strip when the end thereof is reached, a latch engageable with the support for holding the tension rollers in operative position, a gearing, a driving means for the gearing, a shaft driven by the gearing, a latch trip device carried by the shaft, and means for disconnecting the gearing from the driving means.

9. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a pivoted support for the tension rollers, means for swinging said support to release the tension rollers from the strip when the end thereof is reached, a latch engageable with the support for holding the tension rollers in operative position, a gearing, a driving means for the gearing, a shaft driven by the gearing, a latch trip device carried by the shaft, a movable support for the gearing and the shaft, and means for swinging said support to disconnect the gearing from the driving means.

10. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, means for releasing the tension rollers from the strip when the end thereof is reached, means for throwing the rear end of the strip clear of the coating means when the tension rollers release the strip, and means for applying an adhesive to the rear uncoated end of the strip, said end being also wound on the roll.

11. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a rock-shaft supporting the tension rollers, a weighted lateral arm carried by the rock-shaft, a latch for locking the rock-shaft in operative position, and means for tripping the latch.

12. In a machine of the character described, a rotatable spindle, means for coating a strip, said spindle having means for attaching one end of the strip thereto to wind the coated strip into a roll, means for ejecting the roll from the spindle, tension

BEST AVAILABLE COPY rollers associated with the coating means to hold the strip in engagement therewith, a rock-shaft supporting the tension rollers, a weighted lateral arm carried by the rock-shaft, a latch for locking the rock-shaft in operative position, a gearing, driving means for the gearing, a shaft driven by the gearing, a latch-trip device carried by the shaft, a movable support for the gearing and the shaft, and means actuated by the aforesaid arm for swinging said support to disconnect the gearing from the driving means.

13. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a rock-shaft supporting the tension rollers, a weighted lateral arm carried by the rock-shaft, a latch for locking the rock-shaft in operative position, means for tripping the latch, a throw-off device for throwing the rear end of the strip free of the coating means when the tension rollers release the strip, means for applying an adhesive to said rear uncoated end of the strip, said end being also wound on the roll, a lever operatively connected to the throw-off device, and a push bar carried by the aforesaid arm and engageable with the lever for actuating the same.

14. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a rock-shaft supporting the tension rollers, a weighted lateral arm carried by the rock-shaft, a latch for locking the rock-shaft in operative position, means for tripping the latch, a throw-off device for throwing the rear end of the strip free of the coating means when the tension rollers release the strip, means for applying an adhesive to said rear uncoated end of the strip, said end being also wound on the roll, a lever operatively connected to the throw-off device, and a pivoted push bar carried by the aforesaid arm and having a shoulder engageable with the lever for actuating the same.

15. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a rock-shaft supporting the tension rollers, a weighted lateral arm carried by the rock-shaft, a latch for locking the rock-shaft in operative position, a gearing, driving means for the gearing, a shaft driven by the gearing, a latch-trip device carried by the shaft, a movable support for the gearing and the shaft, means actuated by the aforesaid arm for swinging said support to disconnect the gearing from the driving means, a throw-off device for throwing the rear end of the strip free of the coating means when the tension rollers release the strip, means for applying an adhesive to said rear uncoated end of the strip, said end being also wound on the roll, a lever operatively connected to the throw-off device, a pivoted push bar carried by the aforesaid arm and having a shoulder engageable with the lever for actuating the same, and means for disengaging the shoulder from the lever.

16. In a machine of the character described, a rotatable spindle, means for coating a strip, said spindle having means for attaching one end of the strip thereto to wind the coated strip into a roll, means for ejecting the roll from the spindle, tension rollers associated with the coating means to hold the strip in engagement therewith, a rock-shaft supporting the tension rollers, a weighted lateral arm carried by the rock-shaft, a latch for locking the rock-shaft in operative position, a gearing, driving means for the gearing, a shaft driven by the gearing, a latch-trip device carried by the shaft, a movable support for the gearing and the shaft; means actuated by the aforesaid arm for swinging said support to disconnect the gearing from the driving means, a throw-off device for throwing the rear end of the strip free of the coating means when the tension rollers release the strip, means for applying an adhesive to said rear uncoated end of the strip, said end being also wound on the roll, a lever operatively connected to the throw-off device, and a push bar carried by the aforesaid arm and engageable with the lever for actuating the same.

17. In a machine of the character described, a rotatable spindle, means for coating a strip, said spindle having means for attaching one end of the strip thereto to wind the coated strip into a roll, means for holding a portion of the other end of the strip free of the coating means, and an adhesive applying device in the path of the last-mentioned end of the strip on the reverse of the coated side and engageable thereby, said end being also wound on the roll and the adhesive being on the outside of the roll, and means for ejecting the roll from the spindle.

18. A machine of the character described comprising means for coating a strip, a rotatable spindle on which the coated strip is

BEST AVAILABLE COPY wound into a roll, a roll ejector movable along the spindle to eject the roll therefrom, and a radial loop-holding member carried by the ejector.

19. In a machine of the class described, and in combination, a spindle having means for holding one end of a strip to be wound upon the spindle; means for rotating the spindle; and a tape-holder mounted to rotate with said spindle.

In testimony whereof we affix our signatures.

JOSEPH G. KNOWLES.
WILLIAM E. MARTIN.

Copies of this patent may be obtained for five cents each, by addressing the "Commissioner of Patents, Washington, D. C."